Nov. 30, 1965   H. A. JENNINGS   3,220,616
MEANS FOR DISPENSING PASTY MATERIALS FROM CARTRIDGES
Filed March 16, 1964   2 Sheets-Sheet 1
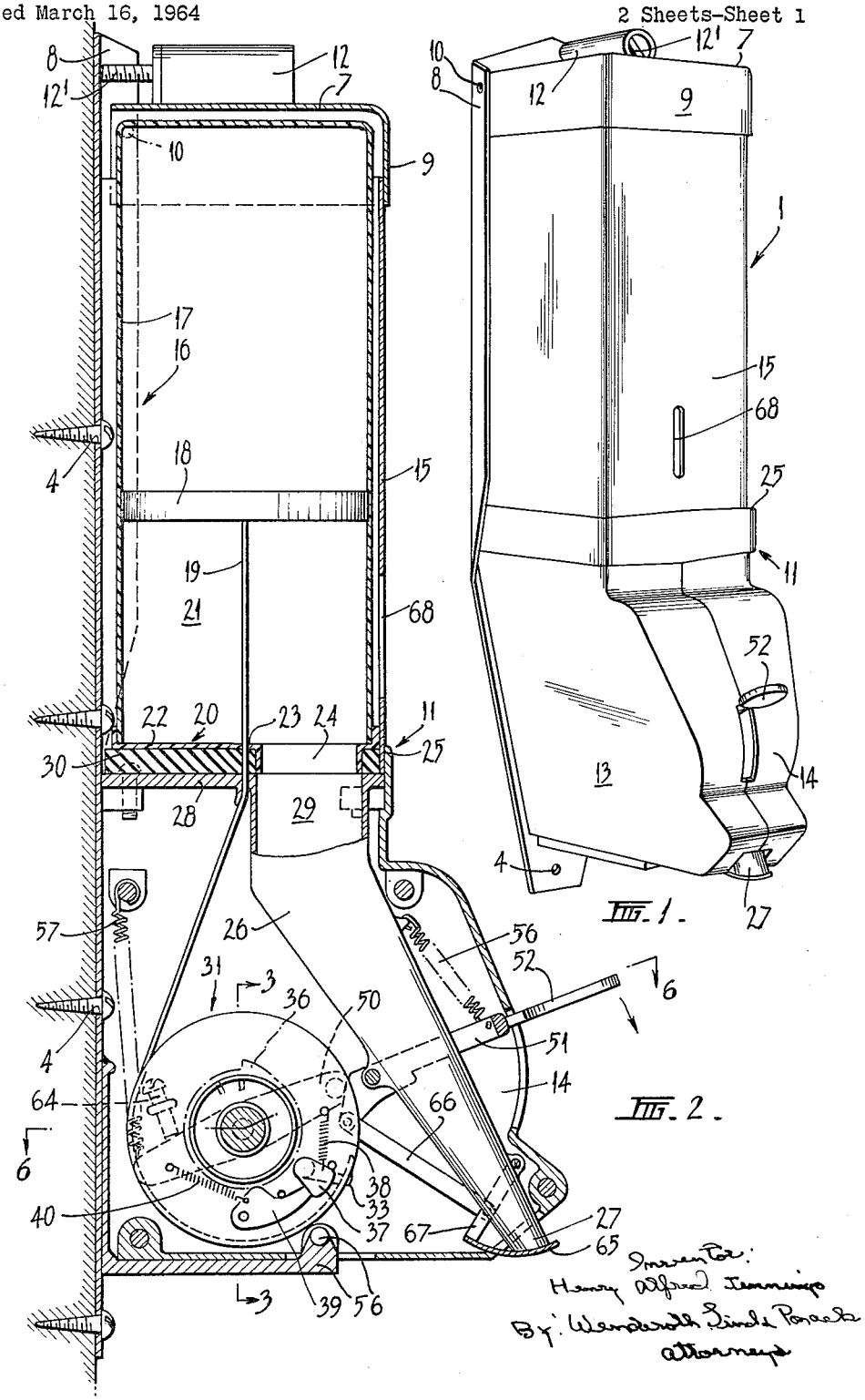

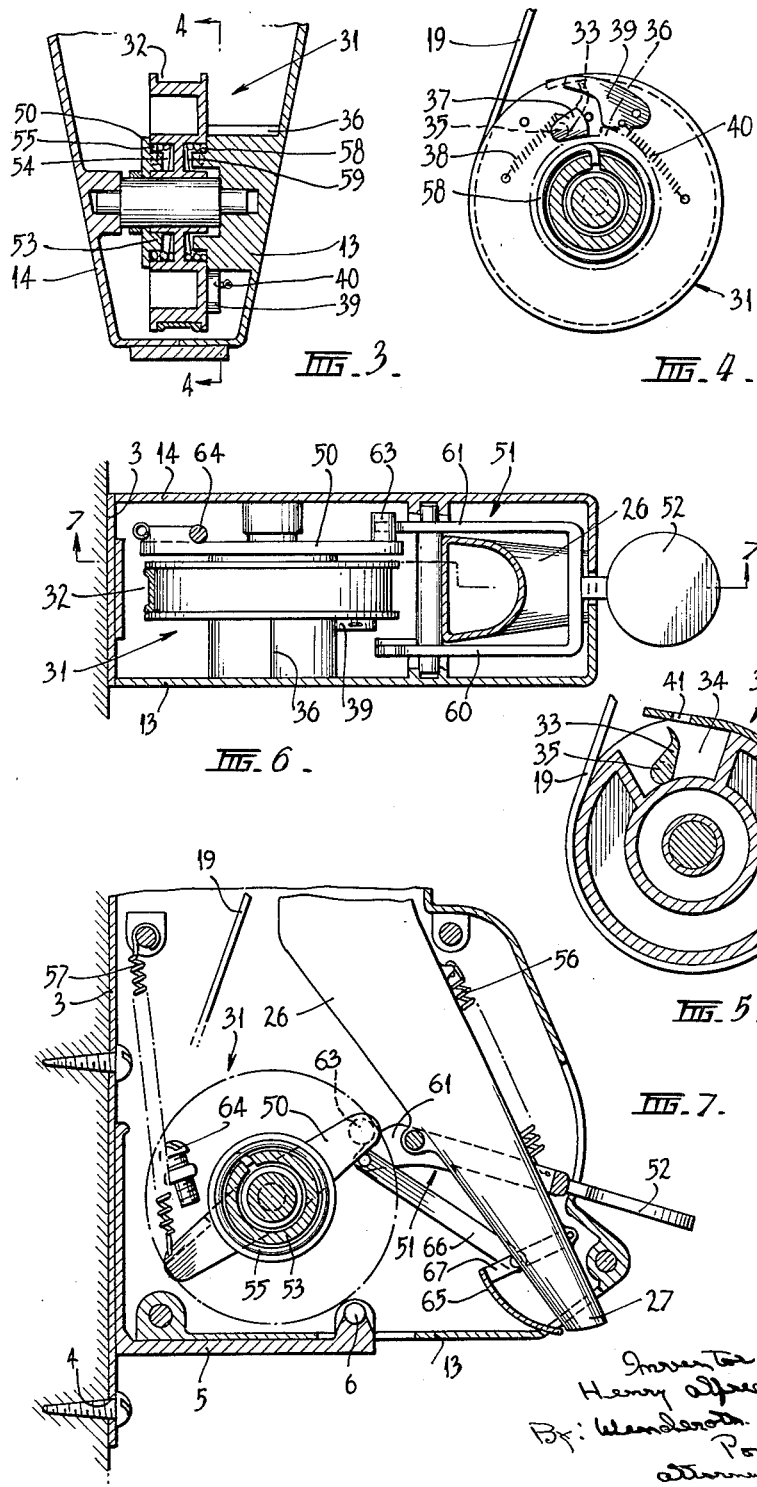

3,220,616
Patented Nov. 30, 1965

3,220,616
MEANS FOR DISPENSING PASTY MATERIALS FROM CARTRIDGES
Henry A. Jennings, Mount Waverley, Victoria, Australia, assignor to Monash Industries Proprietary Limited, Victoria, Australia, a Victorian company
Filed Mar. 16, 1964, Ser. No. 352,100
Claims priority, application Australia, Mar. 19, 1963, 28,515/63; Nov. 12, 1963, 37,554/63
7 Claims. (Cl. 222—327)

This invention relates to the dispensing of paste materials, to a general method of such dispensing and a particular apparatus for dispensing of materials of this type.

An object of the invention is the provision of a method of and apparatus for dispensing paste materials which are retained in cartridges before use.

The method comprises the insertion of a cartridge of paste material in an apparatus providing an open portion of the cartridge against a dispensing nozzle of the apparatus and connecting a tape, which passes through the paste material in the cartridge and is connected to a plunger at the end of the cartridge away from the open portion of the cartridge, to a receiving means which is adapted to draw the tape through the cartridge thus moving the plunger downwardly and expressing the pasty material through the dispensing nozzle.

The invention also includes an apparatus adapted to receive a cartridge of pasty material, the apparatus having a dispensing nozzle adapted for connection with an opening in the cartridge, when the cartridge is positioned, and having means whereby a tape extending through the cartridge and connected at one end to a plunger in the cartridge may be drawn from the cartridge thus moving the plunger and causing pasty material to be dispensed through the dispensing nozzle.

The means of drawing the tape from the cartridge may preferably comprise a wheel having means whereby the end of the tape may be connected to its periphery and having drive means to cause selective rotation of the wheel.

Preferably the circumferential length of the wheel is equal to the length of tape retained in the cartridge and a small amount of extra length so that when full rotation of the wheel is sufficient to move the plunger from the top to the bottom of the cartridge, thus emptying the cartridge. Preferably this wheel member is mounted for rotation having two clutch members affixed thereto, the first of which being in connection with an operating handle or the like whereby the wheel may be rotated in one direction and the second being adapted to prevent rotation of the wheel in a direction opposite to that at which it is driven by the said first clutch. The connecting means on the periphery of the wheel is preferably so formed that on the completion of a full rotation of the wheel the tape is automatically released therefrom to thus allow removal of entry of the cartridge and it prevents damage to the apparatus.

There may also be provided on the apparatus indicating means to show the state of pasty material in the cartridge, for example, indicating marks may be provided on the tape and an aperture may be provided in the apparatus cover to enable the state of the cartridge to be readily ascertained or, alternatively, a device which is only actuated when the cartridge is emptied may be provided to indicate that the cartridge is due for changing.

Throughout this specification the term "tape" may refer to any flexible member such as a tape, a cord, a chain, or the like.

In order that the invention may be more readily understood and put into practice, reference is made to the accompanying drawings in which:

FIGURE 1 is a perspective view of one embodiment of dispenser made in accordance with the invention;
FIGURE 2 is a vertical section of the dispenser of FIG. 1;
FIGURE 3 is a section along line 3—3 of FIG. 2;
FIGURE 4 is a side elevation of the take up wheel of the dispenser;
FIGURE 5 is a transverse section of the wheel of FIG. 4;
FIGURE 6 is a section along line 6—6 of FIG. 2; and
FIGURE 7 is a section along line 7—7 of FIG. 6 and shows the dispenser in a position at which material is dispensed.

The particular apparatus illustrated is a wall mounted dispenser 1 having a casing or body portion 11 which comprises three portions, each of which is, in this embodiment, made of metal.

The first portion is a back plate 3 which is provided with a plurality of apertures 4 therein to enable its connection to a wall and this back plate 3 has a forwardly directed bracket 5 connected thereto at its lower end which bracket has pivot means 6 by which the body portion 11 of the assembly can be pivotally connected thereto. There is also provided a top cap 7 which is hingedly connected to two outwardly directed flanges 8 near the top of the back plate, the cap having a downwardly directed skirt 9 around three of its sides, the location of the hinges 10 and the size of the skirt 9 being such that when the body portion 11 is positioned against the back plate 3 the top cap 7 may be moved downwardly so that its skirt extends over the upper end of the body portion 11 and restrains the main body portion from movement relative to the back plate 3 and top cap 7.

The top cap is provided with an internally threaded portion 12 thereon. A threaded stud 12′ passes through the portion 12 and its inner end may be brought against the back plate 3 to thereby prevent movement of the top cap 3. The threaded stud 12′ is recessed within the portion 12 to prevent unauthorized rotation of the stud 12′.

In the specific embodiment the body portion 11 is formed from three members. The two lower members 13, 14 being die-cast and are adapted to receive the operating mechanism, as will be described hereafter, and the third upper member 15 of which is a substantially rectangular sheet metal member which is adapted to receive the cartridge used with the apparatus.

The cartridge 16 is of polyethylene or other synthetic thermoplastic material which can be cheaply and economically moulded. The cartridge 16 consists of four members, the first of which is the cartridge body 17, which is adapted to be filled with paste and which is in the form of a cylinder having one closed end. When the cartridge 16 is filled, positioned adjacent the closed end of the body 17 is a plunger 18 which has a diameter equal to the internal diameter of the cartridge body and makes a close wiping fit thereagainst. The plunger has fitted thereto, preferably centrally, a tape 19 which may be a tape of any flexible material normally either a metal or a synthetic plastic material and which extends outwardly beyond the open end 20 of the body 17 of the cartridge. The cartridge is filled with a paste material 21 and is fitted with a cap 22 having a central slot 23 through which the tape 19 is passed, the size of the slot being such that the connection between the slot and the tape is a very close one so no paste material can pass from the cartridge through the slot when the tape is moved. The cartridge cap 22 has a further aperture 24 which is brought into contact with the dispensing nozzle of the device as will be described hereafter, this further aperture 24 normally being closed with a closure cap for transport and storage of the cartridge.

The two members 13, 14 of the body portion 11 are so shaped that when they are assembled, they provide a rectangular portion 25 into which fits the lower end of the upper body member 15.

Mounted within the lower portion of the main body is a delivery nozzle 26 which terminates at the front and lower part of the main body with the delivery end 27, the nozzle being downwardly and outwardly directed. The body of the nozzle extends upwardly and slightly rearwardly and its upper end terminates in an extension 28 which is positioned at the upper end of the junction of the upper part of the members 13, 14 below the point of connection with the upper body member 15. The upper end of the nozzle has an aperture 29 which corresponds to the aperture 24 at the lower end of the cartridge 16. This upper end is also provided with a sealing gasket 30 such that when a cartridge is positioned a paste seal is formed between the aperture in the cartridge, which has its cap removed, and the discharge nozzle.

Mounted in the lower portion of the main body is a wheel member 31 which is rotatable about a shaft 41 which is journalled to the members 13, 14 of the body portion 11 with its axis transverse to the axis of the cartridge when it is positioned. This wheel member 31 is provided with a peripheral groove 32 which has a width sufficient to receive the tape 19 extending from a cartridge 16 and has thereon a member 33 by means of which the end of the tape can be connected to the wheel within this groove. This member 33 is mounted on a pivot 35 positioned in a recess 34 in the periphery of the wheel and has a normal position such that it extends outwardly beyond the periphery to engage an aperture 41 in the tape 19.

A cam member 35 is provided on the member 14 of the body portion which cam member is adapted to cooperate with the wheel to move the catch member 33 to thereby release the tape 19.

The catch member 33 has an arcuate extension 37 which is biased by a spring 38 to hold it in its normal position with the catch member 33 extending outwardly beyond the wheel periphery. Adjacent to the catch member 33 there is provided an actuating member 39 which is normally positioned behind the arcuate extension 37 this maintaining the catch member 33 in its normal position against pressure exerted by a tape 19. This actuating member is retained in this position by means of a spring 40.

To release the catch member 33 this actuating member 39 is lifted by the cam 36 on the body on rotation of the wheel 31 and further rotation of the wheel causes the catch member 33 to rotate against its spring 38 thus releasing the tape. This position is illustrated in FIGURE 4. It can be seen that the cam member 36 which causes this release must be positioned so as to operate when the plunger 18 in the cartridge reaches the bottom of the cartridge and preferably before the wheel has done more than one revolution.

This is arranged by having a wheel of such a size that its circumference is substantially equal to the length of the cartridge so that after almost one full rotation of the wheel the plunger 18 reaches the bottom of the cartridge and this releasing action operates.

The rotation of the wheel 31 is by means of an arm 50 which is actuated by a lever 57 one end 51 of which extends exteriorly of the body to be actuated by a figure. This arm is pivotally mounted about the shaft 41 and thus has a common axis with the wheel and it has a portion 53 which extends into an annular recess in the side of the wheel. In this recess 54 there is positioned a helical spring 55 the outer end 56 of which is directed inwardly to provide a contact member which is received in a slot in the portion 53 of the arm. The spring 55 is so located that movement of the arm 50 in the clockwise direction by the lever 57 causes the spring to "unwind" and expand thus preventing rotation of the spring relative to the recess 54 in the wheel thus providing movement of the wheel in the required direction. When the lever 51 is released a spring 56 causes the lever to assume its normal position and a spring 57 causes the arm to rotate in the opposite direction or anti-clockwise direction thus returning it to its normal position.

This opposite movement causes the helical spring 55 in the recess 54 to "wind up" and thus to contract in diameter which permits the arm 50 to move without rotation of the wheel 31. To retain the wheel against rotation, a helical spring 58 is provided in a recess 59 on the opposite side of the wheel to recess 54 which spring 58 is wound in the opposite sense to spring 55. This spring is in its contracted position during movement of the wheel by rotation of arm 50 and does not affect this movement. Backward movement of the wheel whilst the arm is being returned to this initial position by spring 57 is prevented as the spring 58 expands against the wheel on any such movement.

The arm 50 and the lever 51 are not in contact at all times and thus movement of the lever causes movement of the arm only whilst the lever is in contact with the arm.

In the embodiment illustrated the lever 51 is of U shape and the arms 60, 61 of the U are pivotally connected to the body of the dispenser by pin 62.

Arm 61 of the U-shaped lever 51 extends forwardly and beneath an outwardly extending abutment 63 on the actuating arm 50.

An adjustment of the rotation of the wheel 31 for each stroke of the lever 51 is provided which adjustment is controlled by setting the initial position of the arm 50 by means of a set screw. This adjustment does not effect the stroke of the lever 51 as the first portion of this stroke is free should a limited rotation of the wheel be required and the later portion of the stroke causes rotation of the arm and the wheel and thus the movement of the tape 19 and discharge of paste from the cartridge 16. This adjustment therefore provides a constant delivery per stroke over a large range of possible deliveries without any alteration in stroke.

The lever 51 also actuates a slide 65 which covers the end 27 of the delivery nozzle except when delivery is actually taking place. The actuating of the slide 65 is by means of two lever arms 66, 67, the first of which is pivotally connected to the lever 51, and to the second lever arm 67 and this lever arm is pivotally connected at one end to the delivery nozzle 26 and has connected at its other end the slide which moves arcuately over or away from the end 27 of the delivery nozzle depending on whether the lever 51 is in its normal or actuated position.

In order to ascertain the state of the cartridge means, not illustrated, may be provided either on the wheel 33 or on the tape 19 to indicate the position of rotation of the wheel or the length of tape withdrawn from the cartridge to thus indicate the quantity of paste remaining in the cartridge.

In the illustrated embodiment there is provided an aperture 63 in the body through which the position of the plunger 18 can be ascertained over the end of its range of movement without the necessity of opening the body.

In use the stud 12' is loosened permitting the cap 7 to be raised and the body portion 11 to be lowered about its pivot 6. The back plate 3 is positioned adjacent a wall or the like and retained in this position by screws passing through the apertures 4.

A filled cartridge with the cap from its aperture 24 removed is laid along the front face of the upper portion of the body 15 and the tape from the cartridge is passed through the slots in the sealing gasket 30, extension 28 and the cartridge is then positioned against the sealing gasket as illustrated in FIGURE 2.

The aperture 41 in the lower end of the tape 19 is positioned over the extension 33 extending from the wheel 31 and the wheel is rotated until the tape 19 becomes tensioned. At this stage portion of the lever 51 by pressure on its end 52 causes rotation of the arm 50 and paste material 21 passes from the cartridge to the delivery nozzle 26 through aperture 24. On each movement of the lever 51 the slide 65 moves away from the end 27 of the dispensing nozzle because of actuation of its levers 66 and 67. When the dispensing nozzle is filled, paste material is delivered from the end 27 of the dispensing nozzle. At this stage on every actuation of the lever 51 a quantity of paste material is delivered and this quantity can be adjusted by the setting of set screw 64.

The apparatus is operated in this way until the plunger 18 has almost reached the bottom of the cartridge 16 at which time the inwardly directed portion of the actuating member 39 rides on cam 36 and thus moves away from extension 37.

When the member 34 is rotated sufficiently, the tension of the tape 19 will tend to rotate the outwardly extending member 13, and thus the extension 37 in a clockwise direction. At the completion of this movement the end of the tape drops off the outwardly directed member 33 and further actuation of the lever 51 will not cause damage to the mechanism which is free to rotate. At this time it is then necessary to again lower the body 11 and replace the exhausted cartridge with a filled cartridge.

In the embodiment illustrated there is provided an aperture 68 in the upper portion 15 of the body and provided the cartridge body 17 is of a transparent or translucent material the progress of the plunger 18 can be followed without the necessity of lowering the body 11.

As the circumference of the wheel 31 is approximately equal to the length of the cartridge 16 it is possible to arrange the wheel to operate an indication of the position of the plunger at any time by any of several well known means.

I claim:

1. A dispensing apparatus for a cartridge of pasty material having an opening comprising a body, a dispensing nozzle mounted in said body adapted for connection with said opening when said cartridge is positioned in said body, an axis mounted in said body, a wheel having a recess mounted for rotation about said axis, a catch member mounted on a pivot within said recess, a plunger in said cartridge initially positioned away from said opening, a tape extending through said cartridge cooperating at one end with said catch member and connected at its other end to said plunger, means for rotating said wheel to withdraw said tape from said cartridge and thus move said plunger, said catch member having an extreme of movement about said pivot in one direction so that it extends beyond the periphery of said wheel to enable said tape to be connected thereto and in the other direction being such that said catch member is positioned substantially within the periphery of said wheel, an extension member on one side of said wheel coaxial with said catch member connected therewith, said extension member being biassed to retain said catch member in its outward position, and actuatable means to prevent rotation of said extension member.

2. An apparatus as claimed in claim 1 wherein said actuatable means is a pivotally mounted actuator member which is spring biassed so that in its normal position it is positioned closely adjacent said extension member thus preventing rotation of said extension member, said actuator member also being positioned such that once in each rotation of the wheel a cam member, which is fixed in relation to the wheel, causes partial rotation of said actuator member thus permitting said catch member to rotate to its other extreme position.

3. A dispensing apparatus for a cartridge of pasty material having an opening comprising a body, a dispensing nozzle mounted in said body adapted for connection with said opening when said cartridge is positioned in said body, an axis mounted in said body, a wheel having a recess mounted for rotation about said axis, a catch member mounted on a pivot within said recess, a plunger in said cartridge initially positioned away from said opening, a tape extending through said cartridge cooperating at one end with said catch member and connected at its other end to said plunger, means for rotating said wheel to withdraw said tape from said cartridge and thus move said plunger, said catch member having an extreme of movement about said pivot in one direction so that it extends beyond the periphery of said wheel to enable said tape to be connected thereto and in the other direction being such that said catch member is positioned substantially within the periphery of said wheel, an extension member on one side of said wheel coaxial with said catch member connected therewith, said extension member being biassed to retain said catch member in its outward position, actuatable means to prevent rotation of said extension member the circumference of said wheel being substantially equal to the length of the tape within said cartridge, a cam member fixed in relation to said wheel positioned to cause actuation of said actuatable means permitting rotation of said catch member when said wheel has completed one rotation.

4. A dispensing apparatus for a cartridge of pasty material having an opening comprising a body, a dispensing nozzle mounted in said body adapted for connection with said opening when said cartridge is positioned in said body, an axis mounted in said body, a wheel having a recess mounted for rotation about said axis, a catch member mounted on a pivot within said recess, a plunger in said cartridge initially positioned away from said opening, a tape extending through said cartridge cooperating at one end with said catch member and connected at its other end to said plunger, means for rotating said wheel to withdraw said tape from said cartridge and thus move said plunger, said catch member having an extreme of movement about said pivot in one direction so that it extends beyond the periphery of said wheel to enable said tape to be connected thereto and in the other direction being such that said catch member is positioned substantially within the periphery of said wheel, said wheel having an annular recess in one side thereof, a helical spring positioned within said recess with a tight sliding fit, an arm mounted coaxially with said wheel having a portion which enters said recess, the outer end of said spring being retained by said portion of the arm and the direction of the spring helix being such that when the wheel is to be rotated said arm is moved so the spring tends to "unwind" and thus increase in diameter causing the wheel to move with the arm, an actuating lever being in driving connection with said arm.

5. An apparatus as claimed in claim 4 wherein a second similar recess is provided in the other side of said wheel, a second similar spring in said second recess wound in the reverse direction to said first mentioned spring, the outer end of said second spring being fixed relative to said wheel to provide a positive lock to prevent movement of said wheel in a direction opposite that on which dispensing takes place.

6. A dispensing apparatus for a cartridge of pasty material having an opening comprising a body, a dispensing nozzle mounted in said body adapted for connection with said opening when said cartridge is positioned in said body, an axis mounted in said body, a wheel having a recess mounted for rotation about said axis, a catch member mounted on a pivot within said recess, a plunger in said cartridge initially positioned away from said opening, a tape extending through said cartridge cooperating at one end with said catch member and connected at its other end to said plunger, means for rotating said wheel to withdraw said tape from said cartridge and thus move said plunger, said catch member having an extreme of movement about said pivot in one direction so that it extends beyond the periphery of said wheel to enable said tape to be connected thereto and in the other direction being such that said catch member is positioned substantially within the periphery of said wheel, an extension member on one side of said wheel coaxial with said catch member connected therewith, said extension member being biassed to retain said catch member in its outward position, actuatable means to prevent rotation of said extension member, a slide normally covering the end of said dispensing nozzle, and means withdrawing said slide from said nozzle on actuation of the means drawing said tape from said cartridge.

7. A cartridge of paste material comprising a body having an aperture and a paste tight slot in one end of said body, which aperture is adapted to co-operate and form a fluid tight seal with a dispensing nozzle of a dispensing apparatus, a plunger initially mounted in the body away from the apertured end, a tape connected to the plunger, passing through the paste material and through a slot adjacent the aperture and paste material occupying the space in the body between the plunger and the aperture.

References Cited by the Examiner
UNITED STATES PATENTS

| | | | |
|---|---|---|---|
| 1,036,971 | 8/1912 | Craven | 222—392 |
| 2,145,779 | 1/1939 | Puderbaugh | 222—392 X |
| 2,225,433 | 12/1940 | Goldberg | 242—74 |

M. HENSON WOOD, Jr., *Primary Examiner.*

LOUIS J. DEMBO, *Examiner.*